Nov. 3, 1931.  H. G. ANDRÉ  1,830,500
UNILATERAL CONDUCTOR FOR RECTIFYING ALTERNATING CURRENTS
Original Filed Nov. 11, 1924  2 Sheets-Sheet 1

Inventor
H. G. André
By Marker Clerk
Attys.

Patented Nov. 3, 1931

1,830,500

UNITED STATES PATENT OFFICE

HENRI GEORGES ANDRÉ, OF SURESNES, FRANCE

UNILATERAL CONDUCTOR FOR RECTIFYING ALTERNATING CURRENTS

Application filed November 11, 1924, Serial No. 749,214, and in France November 13, 1923. Renewed November 12, 1930.

The present invention relates to improvements in alternating current rectifiers, in which use is made of two metals of different character alternately fulfilling the function of cathode and anode and one of which is oxidized and insulates when it takes the part of the anode, said oxidation being ineffective as insulation when the anode becomes the cathode.

By forming a circuit by means of a conductor of slight insulating oxidation there is provided a unilateral conductor capable of serving as an alternating current rectifier and of numerous applications based on this fundamental property.

Whatever be the choice of the metals used it is absolutely necessary to establish a connection between the electrodes, as, lacking this connection, the current can not circulate in any case in the rectifier circuit.

In electrolytic valves, this is an acid, alkaline or other conducting liquid which establishes the connection between electrodes.

Finally, in a number of different types of dry valves direct contact of dissimilar electrodes is employed.

Good electrolytic operation can not be obtained by reason of forces opposed to the electromotive force and the high internal resistance offered by the apparatus and also because of the production of climbing salts and the rapid disintegration of the electrodes by electrolysis.

Dry valves with contacting electrodes are very unstable by reason of the reduced number of points of contact assuring the passage of current and the frequent possibility of destroying the thin active layer of oxide. If the oxidation is deep the resistance of the contact becomes high as the insulating layer is permanent.

The present invention eliminates these difficulties above mentioned by using electrodes reduced to colloidal or at least finely subdivided state. The invention covers this form of electrode either separately for the anode or for the cathode or for both at the same time, and the use of a slightly electrolyzable liquid such as pure water or otho-phosphoric acid at 60° Baumé (1835 sp. gr.) or sulphuric acid of 66° Baumé or Nordhausen of 20% anhydride.

The anode is preferably of silver in the finely divided state for the reason that the oxide of silver is a good conductor and therefore does not interfere with the passage of current during the operation of the cell. In place of silver, an alloy of silver or one of its compounds may be employed. The cathode is preferably a metal whose oxide is a non-conductor, such as nickel, for example, whose oxide is strongly insulating. A compound of nickel or one of its alloys may be employed, if desired, in place of a nickel electrode. The cathode may be either in solid or in the finely divided state, although a solid cathode is preferably employed. The present invention claims broadly electrodes of the above materials in the forms set forth.

Under the action of the current, the oxygen, which combines with the finely divided silver during the time that it functions as an anode, is transported to the nickel or opposite electrode when the current is reversed, the finely divided silver functioning then as a cathode and the nickel being then oxidized more strongly. The layer of nickel oxide which is thus formed, or increased, adheres closely to the nickel or nickel containing material of the electrode, and forms an insulating layer through which electrons may pass in the direction away from the nickel electrode, but which serves to substantially prevent the passage of electrons in the opposite direction, or in other words from the silver to the nickel containing electrode.

I believe that the vital action at this point is a transference of atoms of oxygen directly from the nickel to the silver when the nickel becomes the cathode, and this occurs without electrolysis by reason of the intimate juxtaposition of the electrodes whereby molecules of oxide may be in contact simultaneously with molecules of both electrodes. That is, the oxygen tends in the same direction as in an electrolyzable liquid (in the direction of electron travel); when it bands with the nickel during one half-cycle, current is obstructed because nickel oxide is insulating, whereas when it bands with the silver during alternate half-cycles current flows because silver oxide is conducting. In view of the foregoing, it is apparent that each of the layers constitute an effect such that when operating in conjunction with the other materials, gives rise to a unidirectionally conducting system. However, inasmuch as the phenomenon is broadly new, I do not desire to be limited to any particular theory of operation.

It is obvious that under these conditions we obtain greater efficiency, and experience has also shown this in cases where use is made of only one plate of silver and one plate of nickel as electrodes.

To bring the current to the electrodes, we may take conductors of the same type as these, but in the usual solid metallic state, such as practically non-oxidizable conductors like platinum, iridium, etc.

The space comprised between the supports of the electrodes should be as small as possible and enclosed so that the finely divided materials will not diffuse but become concentrated. However, it is necessary to keep sufficient liquid in reserve to compensate for evaporation and accidental combinations. The finely divided electrodes are then separated from the free liquid by means of a porous partition which permits the liquid to pass around the supports of the electrodes and on the latter, but retains the finely divided powder.

On the other hand it is necessary to prevent contact of the cathode with the air, whose supplementary oxidizing action would form a quantity of material irreducible through the electric current and which would rapidly and completely insulate the electrodes. The best means consists in immersing this cathode in the liquid as hereinafter indicated.

The apparatus is rendered non-spilling by a reentrant tube placed above the liquid reservoir and which, when concentrated acid is used, opposes the entrance of water vapor contained in the surrounding air. There may also be provided a casing of moisture absorbing material, such as calcium chloride, meta-phosphoric acid, etc.

The accompanying drawings illustrate an exemplary embodiment of the device forming the subject of the present invention, in which.

Figure 2:
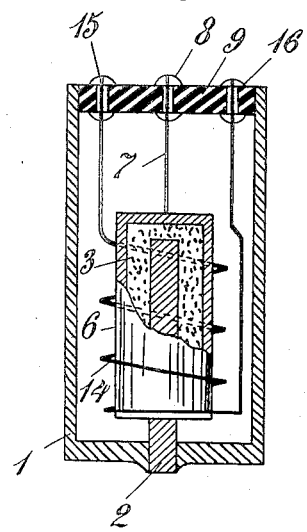
Fig. 2 represents a modification of the apparatus in which the electrolyte is omitted; the electronic emission of the cathode is produced by heating the cathode; the winding 14 is the seat of a current sufficient to produce the Joule effect necessary. In addition, the source of heat for heating the cathode may be of any kind.
Figure 3:
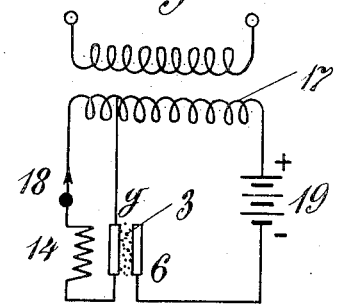

Figure 3 indicates a means of heating the electrodes for priming (or starting) operation in the case of Figure 2.

Figure 4:
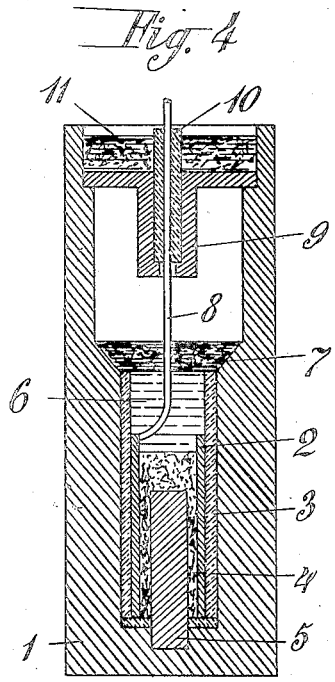
Figure 5:
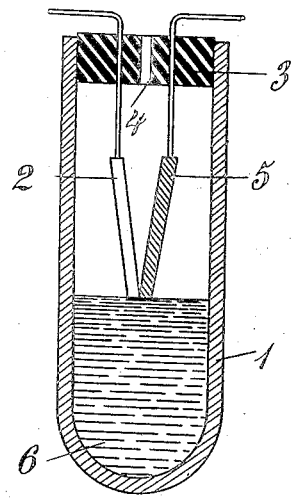

Figures 4 and 5 are sectional views o1 further modified forms of the invention.

Figure 1:
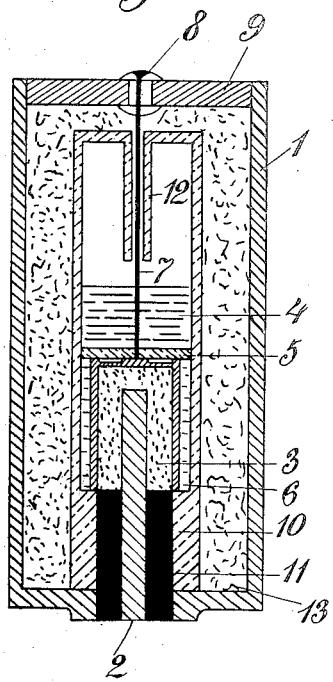
Figure 1 is a vertical section of one form of rectifier.

Figure 1 shows in section a practical form of construction, comprising a unilaterally conducting apparatus having but one colloidal electrode.

In said Figure 1 is a metallic casing, of lead for example, to resist internal or external attack of acids. 2 is a strongly oxidizable electrode, such as aluminum or nickel. It is in intimate contact with the colloidal anode 3 prepared of silver or graphite in suspension in the electrolyte 4 which penetrates into the chamber of the electrodes 3 thru a porous diaphragm or membrane 5 of asbestos, porous procelain, spun glass or other filtering material which prevents diffusion of the colloids into the upper region 4 of the electrolyte. The current enters into the colloidal electrode 3 through the conductor 6, which may be solid, unoxidizable or of invariable superficial conductibility, and which may be of the same material as the colloidal anode but in the solid state.

The intermediate conductor 6 is connected with the exterior by the non-attackable wire 7 soldered to the block or contact 8 insulated from the casing 1 by the wafer 9 of fiber or other insulating material.

The electrodes and the auxiliary electrolyte are contained in a glass tube 10 sealed on the nickel at the lower part by the sulfur member 11, in order to prevent cracks due to compressions of the nickel on the glass during the periods of heating. The sulfur joint is not attacked by acids and is practically leakproof and tight against the liquids.

At 12 there is a fine tube placed above the level of the liquid. This tube, connected at its upper part with the edges of the main tube permits the discharge of the gases and prevents flow of the liquid to the exterior. In the part comprised between the tube 10 and metallic sleeve or casing 1, there is a chemical substance 13, chloride of calcium, meta-phosphoric acid or other material capable of absorbing the surrounding water vapor and thus preserving the concentration of the acid 4 when this kind of liquid is used.

The contribution of oxygen made by the colloidal silver is such that it is possible to omit the electrolyte and hence we have a dry valve possessing the same characteristics as the electrolytic valve indicated. We may even, in such case, before putting the rectifier in operation, form a thin layer of sub-oxide or oxide or other compound of silver on the colloidal silver.

In this case it is necessary to replace the action of transporting the ions previously to the suspension of the colloid in the liquid, by a thermionic transport, by heating the electrodes. Experience has justified this requirement and has confirmed the thermionic conductibility whatever be the method of heating.

There is thus provided a unilateral conductor formed by the contact of two metals or their compounds. The Joule effect between electrodes is sufficient, but should be supplemented with an initial heating furnished by a heating coil for a few seconds.

The heating may be concurrent with the action of a liquid and the invention is based on the two methods separately or combined.

Figure 2 shows a section of an arrangement of the electrodes like that of Fig. 1. It is to be noted that the casing 1 supporting the cylindrical cathode 2, preferably of nickel, is surrounded by colloidal silver 3, reinforced at the exterior by the solid silver conducting sleeve 6 and the wire 7 connected to the block or contact 8. The heating coil 14 is connected with terminals 15 and 16 mounted on the insulating support 9.

Figure 3 shows, for example, how the electrodes 2 and 3 may be heated by means of the resistance 14 connected to the terminals of a fraction of the secondary winding of the transformer 17. The switch 18 permits of interrupting the heating current if the Joule effect is sufficient to maintain the required temperature. The diagram also shows the storage battery 19 which can be recharged by the rectified current through the unilateral conductor 6, 3, 2.

The apparatus may comprise two anodes and one cathode or two cathodes and one anode for total rectification of the two half periods of alternating current.

Among the numerous applications to which this form of invention without electrolyte is adapted, we may mention the detection of wireless telegraphy waves and, in general, all uses of lamps in vacuum, by adding, if required, a third electrode.

Among the numerous advantages presented by the device forming the subject of the invention, we have mentioned above the increase of rectification. It is necessary to add the suppression of electrolysis with all its inconveniences and mainly that coming from boiling, and disintegration of the electrodes during their formation. As may be seen, this permits a considerable reduction of the volume of the apparatus used.

Under these conditions it is necessary to note that the electrodes, in addition to the properties indicated, should have the property of resisting the attack of concentrated acids. Beside silver, use may be made of a good carbon conductor, such as graphite, as an anode. For cathode materials an alloy of lead-antimony may be used or silicon or nickel or an alloy of the two.

The electrodes may acquire the colloidal form by the simple passage of current in an acid medium, whatever be the distance which separates them. The present invention also comprises the above indicated arrangements with direct contact, at least at one point, of solid electrodes, on condition that this contact be made with a very slight pressure.

The present invention comprises the use of one of the electrodes as a container; however, where nickel is used for this it should be capable of oxidizing to a great degree in its part emerging from the level of the liquid. This part should be coated with a material which can not be attacked by acids. It is hence easy to utilize a casing of antimonious lead, but the latter operates under lower tensions than that permitted by nickel.

The difficulty is absolutely resolved if we use a casing of antimonious lead and a rod of nickel affixed to the bottom of the container in any suitable manner, clamped, screwed, soldered or the like.

Figure 4 is a section of such a modified unilateral conductor apparatus as follows:

1 is the lead antimony container preferably, 2 the insulated silver electrode, insulated from the lead wall by a glass tube 3 and which holds the finely divided silver 4 which is in contact with the nickel 5.

Various modifications are provided for holding the liquid 6 immovable; for example it may be mixed with an agglomerant neutral to acids, and covered with a layer of vaseline 7. The silver connection 8 is insulated from the plug 9, if it is a conductor, by a glass tube 10.

Finally, a plastic seal 11, formed of kaolin and vaseline, for example, renders the plug 9 leak-proof.

Where the liquid is held immovable, the conditions being those set forth at the beginning of the present specification, the electrodes may be put in contact above the agglomerant, and capillarity or evaporation will suffice to support the operation of the unilateral conductor.

Figure 5 shows the arrangement of the elements of the unilateral conductor in this case.

The electrodes 2 and 5 are in slight contact on the surface of the mass or agglomerated mixture 6 of sulfuric acid for example, with powdered pumice contained in the glass tube 1, stopped by the plug 3, perforated at 4 for discharge of any gases in the interior.

I claim:

1. Apparatus for rectifying alternating current comprising in combination a metallic film-forming electrode adapted to serve as a cathode, a non-conducting compound on said electrode, a finely divided conducting material having a conducting oxide in proximity to said electrode and composed of a material different in composition from said electrode and adapted to serve as an anode, a slightly ionizable liquid in contact with said metallic material adapted to reform said non-conducting compound upon reduction or modification of the latter.

2. Apparatus for rectifying alternating current comprising in combination a film-forming electrode adapted to serve as a cathode, an oxide layer in contact with said cathode and serving to separate the electrode from adjacent portions of the apparatus, a finely divided material having a conducting oxide in proximity to said oxide adapted to serve as an anode, a slightly ionizable liquid in contact with said metallic material adapted to regenerate said oxide layer.

3. Apparatus for rectifying alternating current comprising in combination an electrode comprising nickel adapted to serve as a cathode, a non-conducting compound of nickel in contact with said electrode and serving to separate the electrode from adjacent portions of the apparatus, a finely divided material having a conducting oxide in proximity to said electrode adapted to serve as an anode, a slightly ionizable liquid in contact with said finely divided material adapted to reform the nickel compound upon reduction or modification thereof.

4. Apparatus for rectifying alternating current comprising in combination a metallic film-forming electrode adapted to serve as a cathode, a coating of an oxidation product thereon adapted to substantially separate the electrode from the adjacent material in contact therewith, a mass of finely divided silver in proximity to said product and adapted to serve as an anode, a slightly ionizable acid in contact with the finely divided silver.

5. Apparatus for rectifying alternating current comprising in combination an electrode comprising nickel adapted to serve as a cathode, a thin covering of nickel oxide upon a portion of said electrode to serve as an insulating means for electrons passing in one direction but to permit passage thereof in the opposite direction, a mass of colloidal silver in contact with the nickel oxide layer and maintained in proximity to the oxide layer by means of a container surrounding said colloidal particles and the oxide covered portion of said electrode, a conducting member connected to said container, means for maintaining sulfuric acid in contact with said colloidal silver and said nickel oxide covering.

6. Apparatus for rectifying alternating current comprising in combination a film-forming electrode adapted to serve as a cathode having thereon a non-conducting covering, a metallic material having a conducting oxide adjacent to said electrode and adapted to form colloidal particles, the oxide of said metallic material being a conductor, said metallic material being adapted to serve as an anode, a slightly ionizable liquid in contact with said metallic material adapted to reform said covering upon modification thereof during the operation of said apparatus.

7. Electrical apparatus comprising two conductors of dissimilar material in contact with each other, a thin surface stratum of one conductor being converted into a compound which obstructs flow of current from one conductor to the other while permitting current flow in the reverse direction, and the other conductor being in the form of finely divided particles having a conducting oxide.

8. Electrical apparatus comprising two conductors of dissimilar material in contact with each other, at least one of the conductors being metallic and having a thin surface stratum converted into an oxidation compound which obstructs flow of current in one direction while permitting flow of current in the reverse direction, one conductor comprising finely divided particles having a conducting oxide massed together and against the other conductor.

9. Electrical apparatus comprising two conductors of dissimilar material substantially in contact with each other, a thin surface stratum of one electrode being converted into a compound which permits flow of current from one conductor to the other while obstructing flow of reverse current, and a slightly-ionizable fluid active during operation to maintain said stratum, one of the electrodes being porous to permit access of said fluid to said stratum.

10. Electrical apparatus comprising two conductors of dissimilar material substantially in contact with each other, at least one of the conductors being metallic and having a thin surface stratum converted into an oxidation compound which permits flow of current from one conductor to the other, while obstructing flow of reverse current, and a slightly-ionizable fluid active during operation to maintain said stratum independently of electrolysis, the other conductor being porous to permit access of said fluid to said stratum.

11. Electrical apparatus comprising two conductors of dissimilar material in close juxtaposition, a film of an oxidation compound permitting flow of current from one conductor to the other while obstructing flow of reverse current, one of said conductors being porous, and a slightly-ionizable fluid in communication with said film through said porous conductor for maintaining said film during operation.

12. Electrical apparatus comprising two electrodes in contact, the oxidation product of one electrode being conducting and of the other unilaterally-conducting, and a slightly ionizable liquid continuously accessible to the junction between the electrodes for producing oxidation.

13. Apparatus for rectifying alternating current comprising in combination a metallic film-forming electrode, a coating of an oxidation product thereon adapted to substantially separate the electrode from the adjacent material in contact therewith, a mass of finely divided silver in proximity to said product, a slightly-ionizable acid in contact with the finely divided silver.

14. Apparatus for rectifying alternating current comprising in combination a metallic film-forming electrode adapted to serve as a cathode, a non-conducting compound on said electrode, a finely divided conducting material having a conducting oxide in proximity to said electrode and composed of a material different in composition from said electrode and adapted to serve as an anode, a slightly-ionizable fluid in contact with said metallic electrode adapted to reform said non-conducting compound upon reduction or modification of the latter, and means for passing an alternating current to the electrode.

15. In an electrolytic rectifier, in combination with a cathode containing silicon, an acid electrolyte comprising sulfuric acid of approximately 1835 specific gravity.

16. Electrical apparatus comprising two conductors of dissimilar material in contact with each other, a thin surface stratum of one conductor being converted into a compound which obstructs flow of current from one conductor to the other while permitting current flow in the reverse direction, and the other conductor being in the form of finely divided silver.

17. Apparatus for rectifying alternating current comprising in combination a film-forming electrode adapted to serve as a cathode, a non-conducting compound on said electrode, a finely divided non-film forming conducting material in proximity to said electrode and composed of material different in composition from said electrode and adapted to serve as an anode, a slightly ionizable liquid in contact with said film-forming electrode adapted to reform said non-conducting compound upon reduction or modification of the latter.

18. Electrical apparatus comprising two conductors of dissimilar material in contact with each other, one of said conductors being of a film-forming material whereby a thin surface stratum of said conductor is converted into a compound which obstructs flow of current from one conductor to the other while current is permitted to flow in the reverse direction, and the other conductor being in the form of finely divided particles, said other conductor being of a non-film forming material.

19. In an alternating current rectifier, a first electrode having an extended electrode surface, a second electrode of finely divided loose material having an extended electrode surface disposed in proximity to the electrode surface of said first electrode to permit direct conduction between said electrode surfaces, the electrodes consisting of materials which form incident to conduction of current therethrough a separator interposed between said electrode surfaces that permits conduction in the direction from one of said electrodes to the other, but opposes conduction in reverse direction.

20. In an alternating current rectifier, a first electrode having an extended electrode surface, a second electrode of finely divided loose material imbued with an electrolyte having an extended electrode surface disposed in proximity to the electrode surface of said first electrode to permit direct conduction between said electrode surfaces, the electrodes consisting of materials which form incident to conduction of current therethrough a separator interposed between said electrode surfaces that permits flow of electrons in the direction from said first electrode to said second electrode, but opposes electron flow in reverse direction.

In testimony whereof I hereunto affix my signature.

HENRI GEORGES ANDRÉ.